(12) United States Patent
Marmaros

(10) Patent No.: US 7,805,495 B2
(45) Date of Patent: Sep. 28, 2010

(54) METHOD AND SYSTEM FOR TRANSFERRING WEB BROWSER DATA BETWEEN WEB BROWSERS

(75) Inventor: David Marmaros, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1072 days.

(21) Appl. No.: 11/096,859

(22) Filed: Mar. 31, 2005

(65) Prior Publication Data

US 2006/0224967 A1  Oct. 5, 2006

(51) Int. Cl.
   *G06F 15/173* (2006.01)
(52) U.S. Cl. ........................ 709/217; 709/223
(58) Field of Classification Search .............. 709/217, 709/223, 220
   See application file for complete search history.

(56) References Cited

U.S. PATENT DOCUMENTS

| | | | | |
|---|---|---|---|---|
| 5,408,421 A | * | 4/1995 | Prest et al. | 702/187 |
| 5,864,751 A | * | 1/1999 | Kazami | 455/161.2 |
| 6,182,212 B1 | * | 1/2001 | Atkins et al. | 713/1 |
| 6,421,050 B1 | * | 7/2002 | Ruml et al. | 345/426 |
| 6,546,393 B1 | | 4/2003 | Khan | |
| 6,661,531 B1 | * | 12/2003 | Murphy et al. | 358/1.15 |
| 6,684,242 B1 | * | 1/2004 | Bahlmann | 709/222 |
| 6,697,837 B1 | * | 2/2004 | Rodov | 709/203 |
| 6,944,653 B2 | * | 9/2005 | Fong et al. | 709/220 |
| 6,963,908 B1 | * | 11/2005 | Lynch et al. | 709/220 |
| 7,032,011 B2 | * | 4/2006 | Woodard et al. | 709/220 |
| 7,032,036 B2 | * | 4/2006 | Linsley | 709/250 |
| 7,340,439 B2 | * | 3/2008 | Burger et al. | 37/467 |
| 7,512,757 B2 | * | 3/2009 | Hiraiwa et al. | 711/162 |
| 2004/0237045 A1 | | 11/2004 | Meltzer | |

OTHER PUBLICATIONS

School of Natural Resources & Environment, "Q&A/How-To Documents from SNRE IT Services," http://sitemaker.umich.edu/snre-it-howto/transferring_bookmarks, 2 pages.
PCT International Search Report for PCT Appln No. US2006/012370, mailed Jun. 7, 2006 (3 pages).
PCT Written Opinion for PCT Appln No. US2006/012370, mailed Jun. 7, 2006 (7 pages).
Fichter, D.: "Tools for Finding Things Again" Online, vol. 28, No. 5, Sep. 2004,—Oct. 2004 pp. 52-56, XP008066006 Wilton, Connecticut.

* cited by examiner

*Primary Examiner*—David Y Eng
(74) *Attorney, Agent, or Firm*—Harrity & Harrity, LLP

(57) ABSTRACT

In one embodiment, a method for transferring web browser data between web browsers includes collecting browser data pertaining to a first web browser, packaging the browser data into an intermediate format, and storing the packaged data for a subsequent import into a second web browser.

16 Claims, 5 Drawing Sheets

METHOD AND SYSTEM FOR TRANSFERRING WEB BROWSER DATA BETWEEN WEB BROWSERS

FIELD OF INVENTION

The field of invention relates generally to transferring application-specific data between applications, and more particularly, to transferring web browser data between web browsers.

BACKGROUND

A web browser is an application program that provides a way to look at and interact with information on the Internet. A web browser typically uses the Hypertext Transfer Protocol (HTTP) to make requests of web servers throughout the Internet on behalf of the browser user. Known web browsers include, for example, Microsoft® Internet Explorer (IE), Netscape® Navigator, Opera browser, Firefox browser and Lynx browser.

Each web browser is associated with a set of browser data that includes, for example, bookmarks, security settings, general settings, links to pages visited by a user, a home page, cookie settings, user interface (UI) elements (e.g., toolbar positions and visibility), etc. A user may decide to switch to a different web browser. For example, the user may switch to a different web browser installed on the same or different computer, or to a different instance of the same web browser installed on the same or different computer. Currently, when a user switches to a new IE browser, the user can transfer bookmarks from an old IE browser to the new IE browser. However, the user has to manually enter the rest of the browser data for the new web browser. In addition, if the two web browsers are of different types (e.g., an old web browser is Netscape Navigator and a new web browser is Microsoft IE), the user may not be able to transfer any of the old web browser data to the new browser.

Thus, what is desired is a method or system that helps overcome one or more of the above-described limitations.

SUMMARY

In one embodiment, a method for transferring web browser data between web browsers includes collecting browser data pertaining to a first web browser, packaging the browser data into an intermediate format, and storing the packaged data for a subsequent import into a second web browser.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for transferring web browser data between web browsers is described. The web browser data includes various property settings specific to a current instance of the web browser by the current instance of the web browser. For example, the web browser data may include bookmarks, security settings, general settings, links to documents accessed by a user, information specifying frequency and times when the documents were accessed (e.g., to determine which links should be displayed in the "already-visited" color, or to power the history pane), a home page, cookie settings, user interface (UI) elements, intermediate files maintained by the web browser, profile/autofill data (e.g., information maintained by a browser for "My Profile" option of a business card tool), password data (e.g., a subset of filled in forms), input history data (e.g., a list of data filled in by a user for text boxes and other web forms encountered by the user), popup blocker and whitelisted sites data, data identifying language and character set, accessibility data, etc. UI elements associated with the web browser may specify, for example, visibility of toolbars in the browser windows, positioning of toolbars within the browser window, visibility of buttons on a toolbar, positioning of buttons on the toolbar, color settings, background images, etc. Intermediate files maintained by the web browser may include, for example, cached documents viewed by the user, plug-in executable files (e.g., plug-ins for displaying different types of audio and video messages), browsing history records, and various temporary files used by the web browser.

In one embodiment, a user may request to export web browser data pertaining to the current web browser. For example, the user may issue such a request by pressing an export settings button on a toolbar in the browser window. In response to the user request, the web browser data is exported from the current web browser, packaged into an intermediate format and stored in a designated data store. The designated data store may be on the same computer as the present web browser or on a server coupled to this computer via a network.

Subsequently, when the user issues a request to import the web browser data onto a new web browser, the stored web browser data is retrieved and applied to the new web browser. The new web browser may be a different web browser installed on the same or different computer. For example, the old web browser may be Microsoft®Internet Explorer (IE) and the new web browser may be Netscape® Navigator. Alternatively, the new web browser may be a different instance of the same web browser (e.g., the IE browser) installed on the same or different computer.

Figure 1:
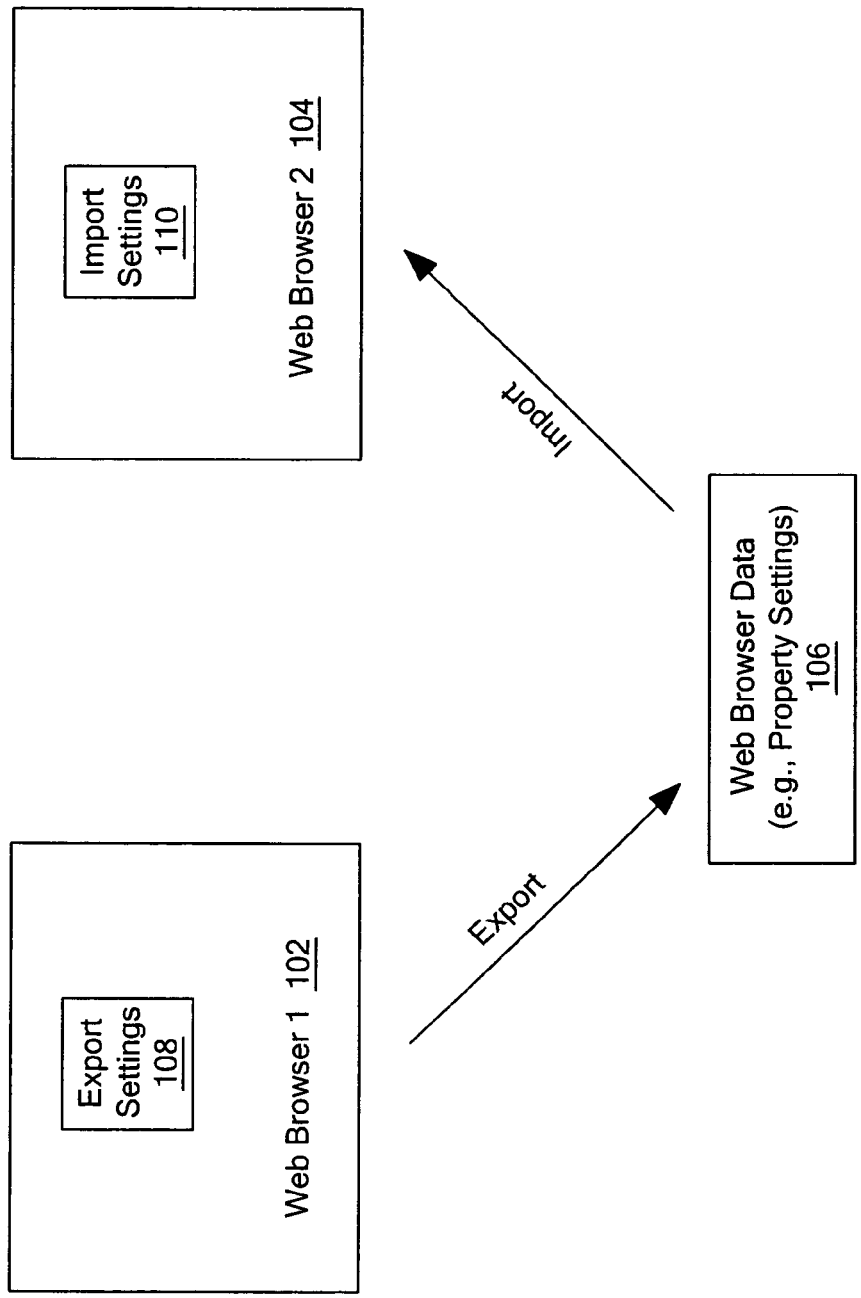
FIG. 1 presents a diagram illustrating an overview of one embodiment of the present invention.

FIG. 1 presents a diagram illustrating an overview of one embodiment of the present invention.

Referring to FIG. 1, a browser window 102 controlled by a first web browser includes an export settings button 108. When a user presses the button 108, the web browser data pertaining to the first web browser 102 is gathered, packaged into an intermediate format, and stored in a data store 106. The data store 106 may be on the same computer as the first web browser or on a server coupled to this computer via a network (e.g., a public network or a local area network).

A browser window 104 is controlled by a second web browser. The second web browser may be a different web browser installed on the same or different computer, or a different instance of the same web browser installed on the same or different computer. The browser window 104 includes an import settings button 10. When the user presses the button 10, the web browser data pertaining to the first web browser is retrieved from the data store 106 and applied to the second web browser. In one embodiment, if the second web browser supports only a subset of the web browser data pertaining to the first web browser, only the web browser data supported by the second web browser is imported onto the second web browser.

It should be noted that the techniques described herein are not limited to web browser applications and can be used with various other applications. For example, these techniques may be used to transfer settings between different instances of Microsoft Word or Microsoft PowerPoint, or to transfer settings from Microsoft Word to Microsoft PowerPoint and vice versa. In another example, these techniques may be used to transfer settings between a web browser and some other application (e.g., Microsoft Word).

In addition, references throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Further, the term "document" as used herein broadly refers to various items, such as files, directories, or other data or information that may be stored, received, sent, created or otherwise processed by one or more computing devices. For example, a document may include any file created on a computing system. The term file as used herein includes a collection of bytes or bits stored as an individual entity. For example, a file may be a binary file, a text file, or a combination thereof, such as a word processor file, a data file, a spreadsheet, a workbook, an image, a drawing, an audio file, a video file, an audio/visual file, a multimedia file, an archive file, a batch file, a source file, an object file, or an executable program. The term file may also refer to a file system object which is accessed as though the object were a file. A document may be linked to one or more other documents, such as via a hyperlink. A document may include a web page, such as a file coded in a markup language (e.g. hypertext markup language (HTML) or extensible markup language (XML)), a file coded in a scripting language (e.g. JavaScript, Active Server Pages (ASP), or Perl), or a file viewed in a web browser (e.g. a portable document format (PDF), an image file or text file). A document may reside on a single system, or may be accessed by one or more systems via a network, e.g. an Intranet or the Internet.

Furthermore, the particular features, structures, or characteristics may be combined in any suitable manner in one or more embodiments.

System Architecture

Figure 2:
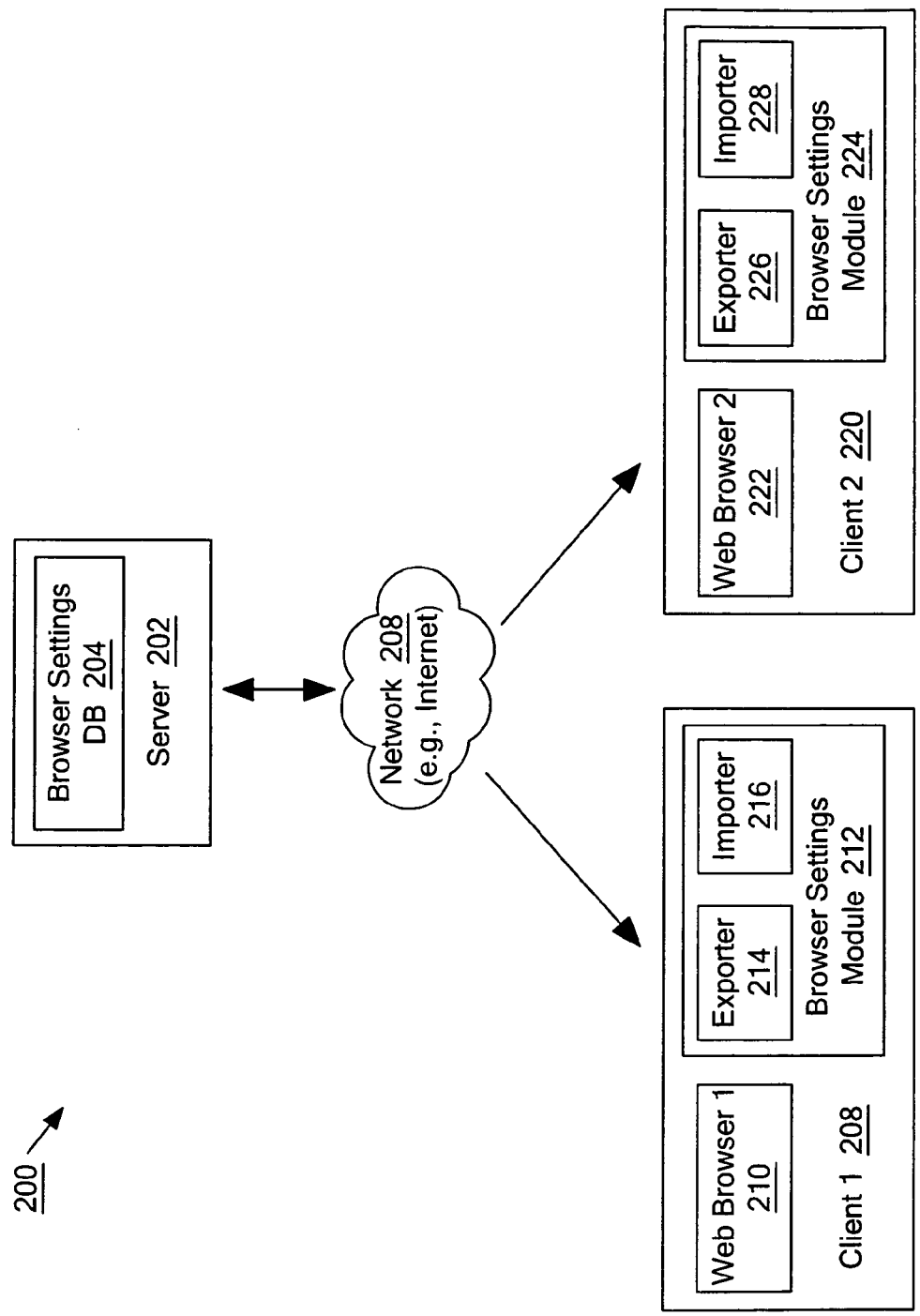
FIG. 2 is a block diagram illustrating an architecture in which one embodiment of the present invention may be implemented.

FIG. 2 is a block diagram illustrating an architecture 200 in which one embodiment of the present invention may be implemented. The architecture 200 includes client devices 208 and 220, a server 202, and a network 206.

The client devices 208 and 220 may be personal computers (PCs), wireless telephones, palm-sized computing devices, personal digital assistants (PDAs), consumer electronic devices, etc. The client devices 208 and 220 are coupled to the server 202 via the network 206, which may be a public network (e.g., Internet) or a private network (e.g., Ethernet or a local area Network (LAN)).

The client devices 208 and 220 host web browsers 210 and 222 respectively. The web browsers 210 and 222 may be of the same type (e.g., the IE browser) or of different types (e.g., the IE browser and the Firefox browser). The client devices 208 and 220 also include browser settings modules 212 and 224 respectively. The browser settings module 212 or 224 may be a part of the corresponding web browser 210 or 220, or a part of some other application (e.g., Google® Firefox Toolbar, Google® Toolbar for Windows, etc.) running on the corresponding client device 208 or 220, or an independent application running on the corresponding client device 208 or 220. In one embodiment, the module 212 is part of a first instance of a specific application (e.g., IE browser or Google Toolbar), and the module 224 is part of a second instance of the same application. Alternatively, the module 212 may be a part of one application (e.g., IE browser) and the module 224 may be a part of another application (e.g., Yahoo Toolbar).

The browser settings modules 212 and 224 communicate with the server 202. In one embodiment, both modules 212 and 224 communicate with the server 202 using the same network protocol (e.g., hypertext transfer protocol (HTTP). Alternatively, the modules 212 and 224 communicate with the server 202 using different network protocols (e.g., HTTP and file transfer protocol (FTP)).

In one embodiment, each of the browser settings modules 212 and 220 includes an exporter (i.e., exporters 214 and 226) and an importer (e.g., importers 216 and 228). Alternatively, the browser settings module 212 or 220 may only include either the exporter or the importer but not both of them.

The exporter 214 or 226 is responsible for collecting web browser data pertaining to the web browser 210 or 222 respectively, packaging the collected data into a canonical format, and sending the web browser data in the canonical format to the server 202, which then stores this web browser data in a browser settings database 204. A canonical format referred to herein is an intermediate format that provides a flexible way for describing data and is understandable by various browser settings modules including modules 212 and 224. Examples of the canonical format may include the extension markup language (XML) format, the binary format, etc.

The browser settings database 204 stores web browser data for various web browsers. In an another embodiment, the browser settings database 204 may be located on the client device 208 or 220. Alternatively, the web browser data may be stored using a different storage means (e.g., a file on disk).

The importer 216 or 228 is responsible for importing, onto the web browser 210 or 222 respectively, web browser data pertaining to a different web browser. For example, the importer 216 may import web browser data pertaining to the web browser 222 onto the web browser 210. In one embodiment, if the web browser targeted for import supports only a subset of web browser data pertaining to the source web browser, the importer extracts the subset supported by the target web browser from the relevant web browser data stored in the database 204 and applies the extracted web browser data to the target web browser.

In one embodiment, the importer 216 or 228 can only import specific web browser data. The importer 216 or 228 may determine whether a web browser data item can be imported by comparing a data type tag assigned to the web browser data item by the exporter 214 or 226 with a predefined list of allowed data types. In one embodiment, if the importer 216 or 228 encounters a web browser data item of an unknown type, heuristics rules are utilized to determine how to handle this web browser data item.

In one embodiment, the browser settings module 212 or 224 displays an export settings button and/or an import settings button as part of a toolbar or somewhere else within the browser window. When the user presses the export settings button, the exporter 214 or 226 initiates the export of relevant web browser data. Similarly, when the user presses the import settings button, the importer 216 or 228 initiates the import of desired web browser data.

Alternatively, the user may request export or import of browser settings by selecting a specific option in a web browser window (e.g., by selecting an entry in Tools drop-down list) or somewhere else on the screen (e.g., on the control panel, a separate application, etc.), or pressing a specific key on the keyboard, or using some other method.

In one embodiment, when a user issues a request to export/import web browser settings, the user is allowed to specify the desired settings. For example, once the user presses the export settings button, the user is presented with a list of settings that can be exported, from which the user can select some settings for exporting.

In another embodiment, the export occurs automatically (i.e., without a user request) at regular intervals (e.g., for a backup function). Similarly, the import may also occur automatically at regular intervals (e.g., to keep two computers synchronized).

Description of Process

Figure 3:
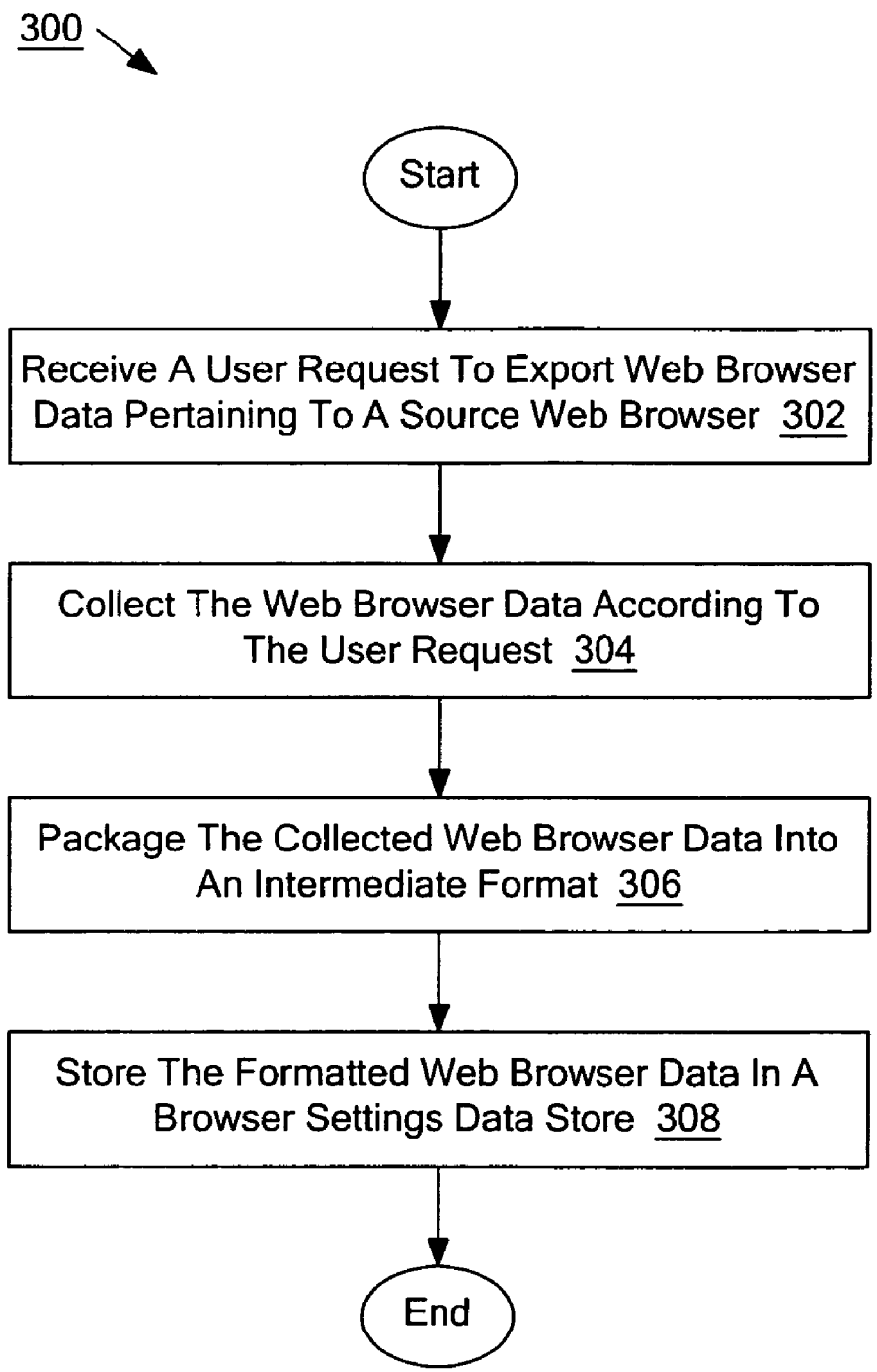
FIG. 3 is a flow diagram of one embodiment of a method for exporting web browser data.

FIG. 3 presents a flow diagram of one embodiment of a method 300 for exporting web browser data. The method may be performed by processing logic, which may comprise hardware, software, or a combination of both. Processing logic may reside either in a client device, or partially or entirely in a separate device and/or system(s).

At block 302, processing logic receives a user request to export web browser data pertaining to a current web browser (referred to as the source web browser). As discussed above, the web browser data may include bookmarks, security settings, general settings, links to documents accessed by a user, a home page, cookie settings, user interface (UI) elements, intermediate files maintained by the web browser, etc. UI elements associated with the web browser may specify, for example, visibility of toolbars in the browser windows, positioning of toolbars within the browser window, visibility of buttons on a toolbar, positioning of buttons on the toolbar, color settings, background images, skins, themes, etc. Intermediate files maintained by the web browser may include, for example, cached documents viewed by the user, plug-in executable files (e.g., plug-ins for displaying different types of audio and video messages), browsing history records, and various temporary files used by the web browser. In one embodiment, processing logic receives the user request when the user presses an export settings button in the browser window. In one embodiment, the user request specifies which browser settings need to be exported. Alternatively, the user request covers all web browser data pertaining to the source web browser.

At processing block 304, processing logic collects the web browser data according to the user request.

At processing block 306, processing logic packages the collected web browser data into an intermediate format (e.g., an XML format, a binary format, etc.).

At processing block 308, processing logic stores the formatted web browser data in a browser settings data store. In one embodiment, this data store resides on the same client device as the source web browser. Alternatively, the browser settings data store resides on a server.

Figure 4:
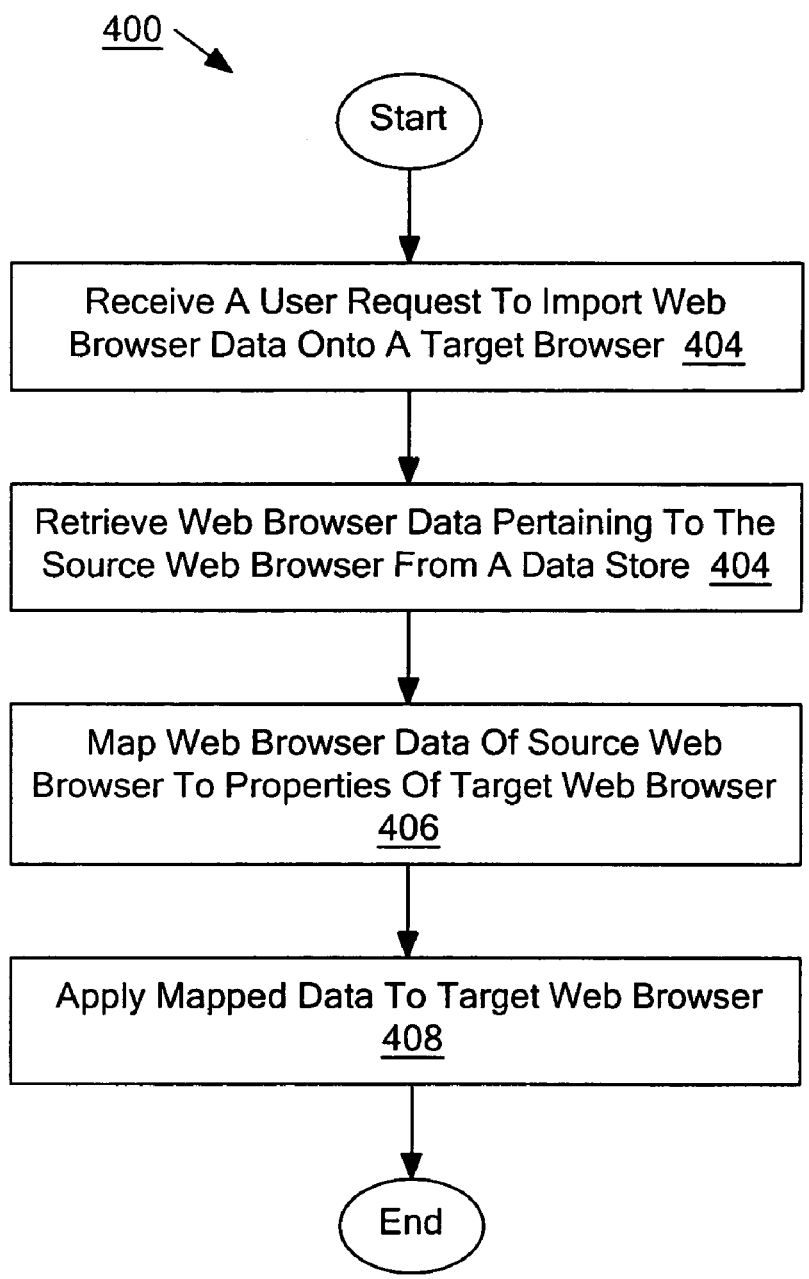
FIG. 4 presents a flow diagram of one embodiment of a method for importing web browser data.

FIG. 4 presents a flow diagram of one embodiment of a method 400 for importing web browser data. The method may be performed by processing logic, which may comprise hardware, software, or a combination of both. Processing logic may reside either in a client device, or partially or entirely in a separate device and/or system(s).

At block 402, processing logic receives a user request to import web browser data onto a current web browser (referred to as the target web browser). In one embodiment, the user request identifies the source web browser whose data is to be imported onto the target web browser (e.g., by identifying the instance of the web browser or the type of the web browser). In one embodiment, the user request specifies which browser settings need to be imported. For example, the user may be presented with a list of available settings to allow the user to select the desired settings. Alternatively, the user request covers all web browser data pertaining to the source web browser.

The source web browser and the target web browser may reside on the same client device or different client devices and may be of the same browser type or different browser types.

At block 404, processing logic retrieves web browser data pertaining to the source web browser from a data store. In one embodiment, processing logic retrieves the web browser data upon verifying that the target importer has permissions to access the web browser data. The data store may reside on the same client device as the target web browser, on the client device hosting the source web browser, or on a server. The web browser data is stored in the data store in an intermediate format (e.g., XML or binary format). In one embodiment, if the user request specifies certain browser settings to be imported, processing logic extracts the specified settings from the retrieved web browser data.

At block 406, processing logic maps the web browser data to properties of the target web browser. If the target web browser does not support all of the available browser settings, processing logic discards the portion of web browser settings that is not supported by the target web browser.

At block 408, processing logic applies the mapped data to the target web browser.

Exemplary Computer System

Figure 5:
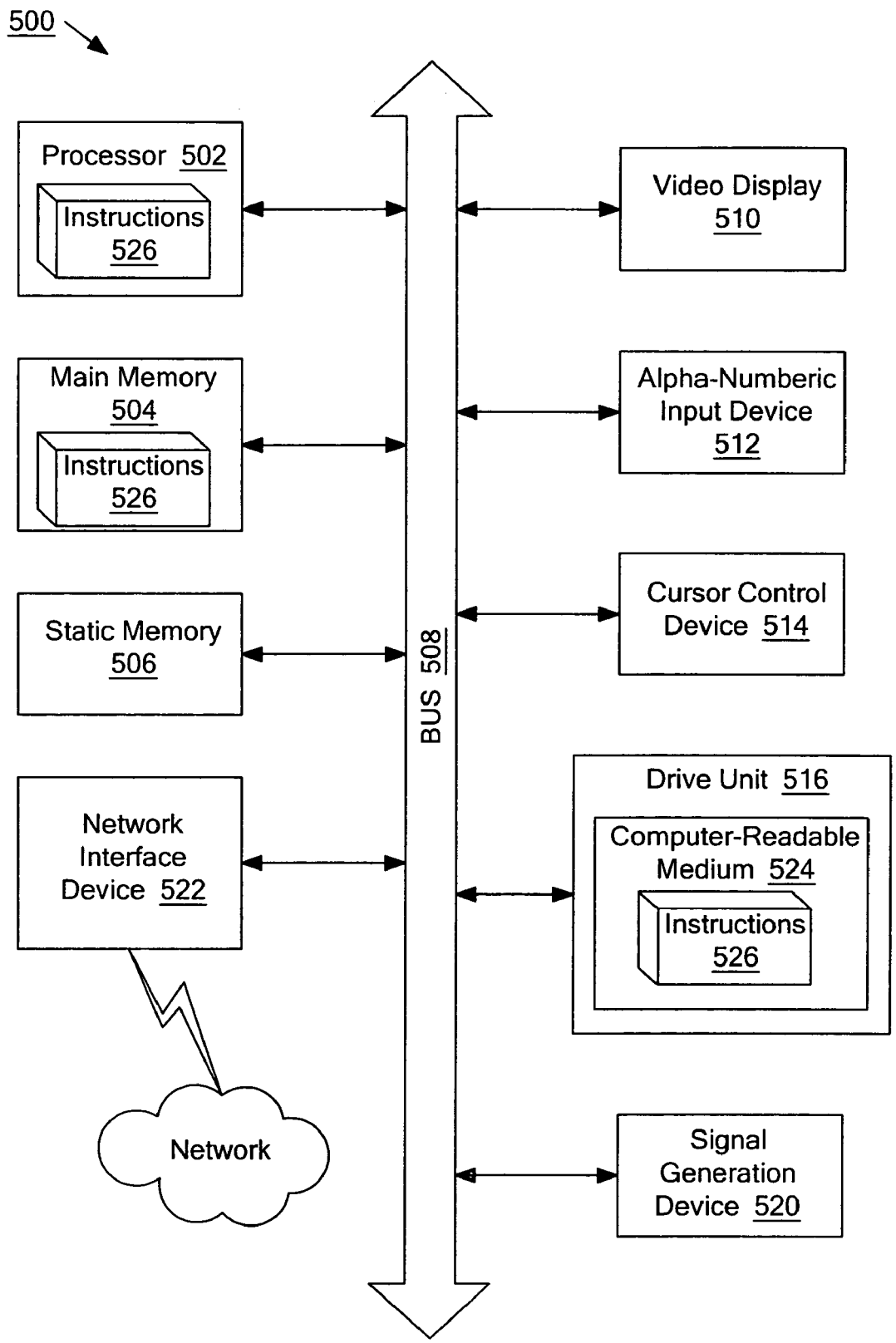
FIG. 5 is a block diagram of one embodiment of a computer system.

FIG. 5 shows a diagrammatic representation of a machine in the exemplary form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method performed by a client device, the method comprising:
   collecting, by one or more processors of the client device, browser data associated with a first web browser, without receiving a user request to export the browser data, the collected browser data having a first data format,
   where the browser data includes one or more data items, the one or more data items comprising at least one of user interface (UI) elements, security settings, general settings, browsing history data, or information specifying frequency and times of accessing documents, associated with the first web browser;
   transforming, by one or more processors of the client device, in response to the collecting, the collected browser data into an intermediate format, the first data format being different from the intermediate format, the intermediate format comprising an extensible markup language (XML) format and being understandable by the first web browser,
   where transforming the browser data into the intermediate format comprises:
      assigning a tag to each of the one or more data items included in the collected browser data, the tag representing a data type of a corresponding data item; and
      storing, by one or more processors of the client device, the transformed browser data for a subsequent import onto a second web browser, the second web browser utilizing browser data having a second data format, the second data format being different from the intermediate format and the first data format, the intermediate format being understandable by the second web browser.

2. The method of claim 1 where the one or more data items further comprise at least one of bookmarks, a homepage, a cookie, links, cache data, temporary files, intermediate files maintained by the web browser, profile/autofill data, password data, input history data, popup blocker and white listed sites data, data identifying language and character set, accessibility data, or a list of plug-ins.

3. The method of claim 1 where the first web browser and the second web browser are web browsers of two different types.

4. The method of claim 1 wherein the first web browser resides on a first device and the second web browser resides on any one of the first device and a second device.

5. The method of claim 1 further comprising receiving a user request to export browser data associated with a third web browser, the received user request to export the browser data being received upon a user activating a user interface element in a window controlled by the third web browser, the user interface element being a button on a toolbar associated with the third web browser.

6. The method of claim 1 further comprising:
   receiving a user request to import the browser data onto the second web browser; and
   applying the transformed browser data to the second web browser.

7. The method of claim 1 where the transformed browser data is stored on a server.

8. A method performed by a client device, the method comprising:
   receiving, by one or more processors of the client device, a user request to import browser settings of a first web browser, associated with another client device, onto a second web browser, associated with the client device, the browser settings of the first web browser being in a first data format, and the second web browser having browser settings in a second data format that is different from the first data format;
   accessing, by one or more processors of the client device, browser data, associated with the browser settings of the first web browser, that is stored, the browser data being transformed from the first format into an intermediate format prior to being stored, the intermediate format being different from the first data format and the second data format, and being understandable by the client device and the other client device,
   where the intermediate format comprises an extensible markup language (XML) format, and where the intermediate format includes one or more data type tags assigned to one or more data items included in the browser data, in the first format, of the first web browser;

comparing, by one or more processors of the client device, the one or more data type tags to data types supported by the second web browser;

determining, by one or more processors of the client device, based on the comparing, whether the second web browser supports a subset of the stored browser data in the intermediate format;

extracting, by one or more processors of the client device, and based on a result of the determining, at least a portion of the stored browser data; and importing, by one or more processors of the client device, the extracted at least portion of the stored browser data onto the browser settings of the second web browser.

9. The method of claim 8 further comprising:

determining that the second web browser supports the subset of the stored browser data pertaining to the first web browser, where the extracting comprises:

extracting, based on a result of determining that the second web browser supports the subset of the stored browser data, the subset of browser data from the stored browser data, where the importing comprises:

applying the extracted subset of the stored browser data to the browser settings of the second web browser.

10. The method of claim 8 where the one or more data items include at least one of bookmarks, a homepage, a cookie, links, user interface (UI) elements, security settings, general settings, cache data, temporary files, browsing history data, or a list of plug-ins.

11. The method of claim 8 where the first web browser and the second web browser are web browsers of two different types.

12. The method of claim 8 where the first web browser and the second web browser reside on two different devices.

13. The method of claim 8 further comprising receiving a user request to import browser data, the user request to import browser data being received upon a user activating a user interface element in a window controlled by the second web browser, the user interface element being an import settings button provided on one of a tool bar or a menu of the window.

14. The method of claim 8 where the stored browser data is accessed from a server.

15. An apparatus comprising:

means for collecting browser data pertaining to a first web browser, the browser data having a first data format;

means for transforming, based on the collecting, the browser data into an intermediate format, the first data format being different from the intermediate format, the intermediate format being understandable by the first web browser, where the intermediate format includes an extensible markup language (XML) format, and where the means for transforming the browser data into the intermediate format comprises:

means for assigning a plurality of tags to one or more data items included in the browser data, one or more tags, of the plurality of tags, representing a data type of a corresponding data item, the one or more data items comprising at least one of user interface (UI) elements, browsing history data, or information associated with at least one of frequency or times of accessing documents; and means for storing the transformed browser data for a subsequent import onto a second web, the second web browser utilizing browser data having a second data format, the second data format being different from the intermediate format and the first data format, the intermediate format being understandable by the second web browser, where the first web browser and the second web browser are web browsers of different types.

16. An apparatus comprising:

means for receiving a user request to import browser settings of a first web browser onto a second web browser, the browser settings of the first web browser being in a first data format, and the second web browser having browser settings in a second data format that is different from the first data format;

means for accessing stored browser settings associated with the first web browser, the stored browser settings being previously transformed into an intermediate format prior to being stored, the intermediate format being different from the first and second data format, and being understandable by the first and second web browsers, where the intermediate format comprises an extensible markup language (XML) format, and where the intermediate format includes one or more data type tags assigned to data items included in the browser settings of the first web browser;

means for comparing the one or more data type tags to data types supported by the second web browser;

means for determining that the second web browser supports a subset of the stored browser settings, based on a result of the comparing; and means for importing, based on a result of the determining, the subset of stored browser settings onto the second web browser.

* * * * *